United States Patent [19]
Mandava

[11] Patent Number: 5,208,769
[45] Date of Patent: May 4, 1993

[54] UNSIGNED INTEGER MULTIPLY/DIVIDE CIRCUIT

[75] Inventor: Babu S. Mandava, Campbell, Calif.

[73] Assignee: Zilog, Inc., Campbell, Calif.

[21] Appl. No.: 762,593

[22] Filed: Sep. 19, 1991

[51] Int. Cl.⁵ ............................................. G06F 7/52
[52] U.S. Cl. ................................................ 364/766
[58] Field of Search ............... 364/759, 766, 787, 788

[56] References Cited

U.S. PATENT DOCUMENTS

| | | | |
|---|---|---|---|
| 3,993,891 | 11/1976 | Beck et al. | 364/788 |
| 4,228,518 | 11/1980 | Chamberlin | 364/759 |
| 4,573,137 | 2/1986 | Ohhashi | 364/788 |
| 4,682,303 | 7/1987 | Uya | 364/788 |
| 4,761,760 | 8/1988 | Tomoji | 364/788 |
| 4,878,191 | 10/1989 | Oguchi | 364/759 |
| 5,014,233 | 5/1991 | Kihava et al. | 364/766 |
| 5,027,309 | 6/1991 | Koumoto et al. | 364/766 |

Primary Examiner—David H. Malzahn
Attorney, Agent, or Firm—Majestic, Parsons, Siebert & Hsue

[57] ABSTRACT

An unsigned integer multiply/divide circuit is implemented with an unconventional non-restoring division algorithm which always subtracts the divisor from the partial dividend regardless of whether the divisor is greater than the partial dividend or not, a hybrid carry lookahead and carry select adder construction where both portions run in parallel, and control lookahead features which avoid interim calculation wait delays. The division algorithm is further modified in order that the same hardware configuration primarily consisting of storage registers, an adder, a multiplexer, and a shifter can be used for both multiplication and division operations.

3 Claims, 8 Drawing Sheets

UNSIGNED INTEGER MULTIPLY/DIVIDE CIRCUIT

BACKGROUND OF THE INVENTION

This invention relates in general to digital computational circuits and in particular, to an unsigned integer multiply/divide circuit with related control logic.

Several methods are well known for implementing integer multiply and divide circuits. Typically, these methods utilize operational algorithms in conjunction with components such as shift registers and adder circuits. See, e.g., Mano, M. M., *Computer System Architecture*, 2d Ed., Prentice/Hall, 1982.

Also, several methods are well known for implementing adder circuits. Two such methods are carry lookahead and carry selection. See, e.g., Hwang, K., *Computer Arithmetic*, John Wiley & Sons, Inc., 1979.

In integrated circuit implementations, increasing speed and reducing the number of transistors to accomplish the same function are highly desirable goals to improve device performance and reduce overall circuit size and, as a result, circuit cost. Therefore, it is a primary object of the present invention to provide an unsigned integer multiply/divide circuit that operates with improved speed characteristics and reduces the amount of integrated circuit area necessary for its implementation.

SUMMARY OF THE INVENTION

These and additional objects are accomplished by the various aspects of the present invention. Briefly stated, the invention accomplishes these objects by means of an unique division algorithm, adder design, and control lookahead logic. It is important to note that each of these aspects of the invention can be useful, not only in combination with one another, but also, individually.

The division algorithm has two aspects to it. The first employs a modified version of the standard nonrestoring method of division. The modification enhances speed by eliminating from the standard restoring method, one write operation into the partial dividend register every time the divisor is larger than the partial dividend. Also, the algorithm can reduce circuit size through simplified control logic, because it always subtracts the divisor from the partial dividend regardless of whether the divisor is greater than the partial dividend or not, unlike other traditional division algorithms.

The second aspect employs two additional steps in the division algorithm in order that both division and multiplication operations can be accomplished through the same register, shifter and adder configuration. Since the multiplication algorithm requires an add before a shift right, a typical multiplication circuit requires that a shifter follow the adder. However, the division algorithm requires a shift left before a subtract. This requires a shifter before the adder. In order to share the same hardware configuration without requiring a shifter both before and after the adder, one of the algorithms must be modified. Since for most digital signal processing applications the speed of multiplication operations is most critical, the division algorithm was modified. To accomplish this, the shifter was configured to be after the adder to optimize multiplication operations and the division algorithm was modified to add the additional steps of an initial dummy left shift and a final right shift adjustment.

The adder employs a hybrid carry lookahead and carry select construction consisting of a carry lookahead section and carry select section, each section running in parallel. In the preferred embodiment, the carry lookahead section includes three 4-bit carry lookahead units connected in series, each constructed by complex gate circuitry. The carry lookahead section computes the first 12 bits of a 16 bit sum plus a carry-out bit for the section. The carry select section computes the last 4 bits of the 16 bit sum plus a final carry-out bit. The carry select section includes dual 4-bit adders each assuming a different carry-in bit. Output from the dual adders are then multiplexed with selection determined by the carry-out bit of the previously described carry lookahead section. Since the carry lookahead and carry select sections compute in parallel, the hybrid arrangement provides enhanced speed over a traditional two-level carry lookahead adder constructed in 4-bit serial stages.

The control lookahead logic eliminates the necessity of combinatorially determining certain control signals in each clock cycle. Although one extra clock cycle is initially required to look ahead one cycle, by so doing, one or more gate delays is saved in each succeeding cycle in a divide or multiply operation. Thus, in a 16 bit divide or multiply operation, although 17 clock cycles are required instead of the normal 16, the savings of one or more gate delays per clock cycle allows selection of a shorter clock cycle, thus, increasing clock speed and reducing the overall time required to conduct the operation.

Additional objects, features and advantages of the various aspects of the present invention will become apparent from the following description of its preferred embodiments, which description should be taken in conjunction with the accompanying drawings.

DETAILED DESCRIPTION OF THE INVENTION

General Overview

Figure 1:
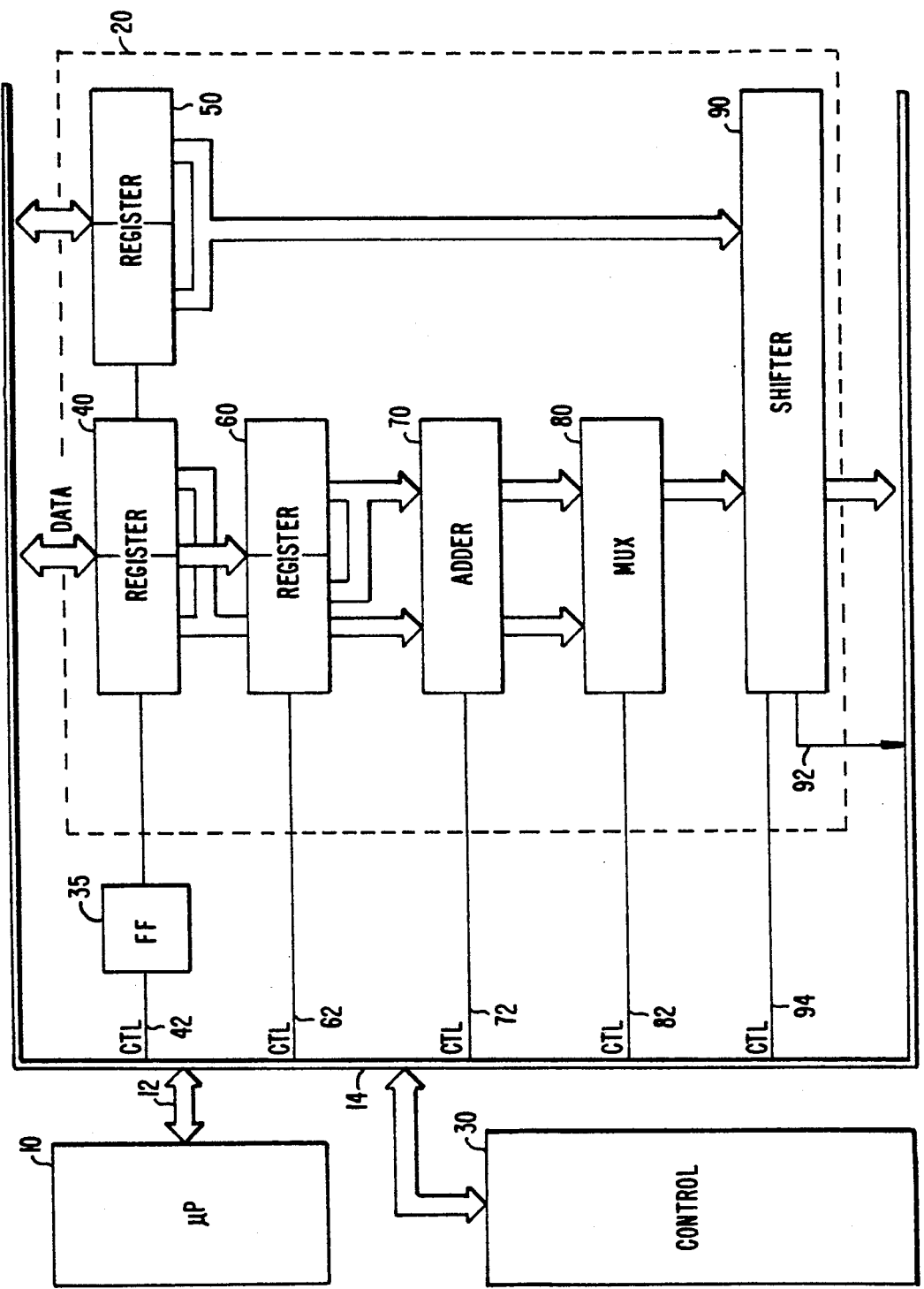
FIG. 1 is a block diagram of a computer system, as an example, in which the various aspects of the present invention are utilized.

FIG. 1 is a block diagram of a system utilizing the applicant's invention. A microprocessor 10 writes and reads control signals 12 to and from control logic 30 via the system bus 14. Signals written to the control logic 30 include multiply and divide commands, and signals read from the control logic 30 include handshaking, division overflow and divide by zero error information.

Microprocessor 10 also stores and retrieves operand, operator and result data into and out of registers 40, 50 and 60 via the system bus 14. In a multiplication operation, initially the multiplier is written into register 50 and the multiplicand into register 60. When multiplication is completed, the product is read out of registers 40 and 50 with the most significant bit (MSB) of the product in the left-most bit of register 40 and the least significant bit (LSB) of the product in the right-most bit of register 50.

In a division operation, initially the divisor is written into register 60 and the dividend into registers 40 and 50 with the MSB of the dividend in the left-most bit of register 40 and the LSB of the dividend in the right-most bit of register 50. When division is completed, the quotient is then read out of register 50 and the remainder out of register 40.

Both multiply and divide algorithms are implemented in control logic 30. Both share the same register/adder/shifter circuitry 20 to conduct their operations. Since the multiply algorithm requires an add before a shift right and the divide algorithm requires a shift left before a subtract, one of the algorithms must be modified in order for the same circuitry to be usable by both. To optimize the speed of multiplication, the division algorithm was modified.

Although hardware could also be shared by eliminating shifter 90 and using shift registers for register 40 and 50, this implementation would require an additional clock cycle to shift the shift registers. Shifters, on the other hand, are combinational logic that do not require an additional clock cycle and are thus preferred so that computational speed can be optimized.

Multiplication

A conventional multiplication algorithm is utilized in the applicant's invention (see, e.g., Mano reference). When multiplying, initially a zero is written into register 40, the multiplier into register 50, and the multiplicand into register 60. The multiplication algorithm then looks at the LSB of register 50 and proceeds according to whether the bit is a 1 or a 0.

If the LSB of register 50 is a 1, the contents of registers 40 and 60 are added together in adder 70 to generate a sum and carry-out bit. The sum is then passed through multiplexer 80 to the most significant bit inputs (bits 16–31) of shifter 90, and the contents of register 50 are passed directly to the least significant bit inputs (bits 0–15) of shifter 90. The outputs of shifter 90 then include the inputs shifted one bit to the right with the carry-out bit of adder 70 shifted into the MSB location (bit 31) and the former LSB of register 50 shifted out and discarded. The most significant 16 bits of the outputs are then written into register 40, the least significant 16 bits into register 50, and the process repeated until multiplication is completed.

If the LSB of register 50 is a 0, however, instead of the contents of register 40, a zero is added to the contents of register 60. The sum is then passed to the inputs of the most significant 16 bits of shifter 90 (bits 16–31) through multiplexer 80, the contents of register 50 passed to the least significant 16 bits of shifter 90 (bits 0–15), and the outputs of shifter 90 then including the inputs shifted one bit to the right with a zero shifted into the MSB location (bit 31) and the former LSB of register 50 shifted out and discarded. The most significant 16 bits of the outputs are then written into register 40, the least significant 16 bits into register 50, and the process repeated until multiplication is completed.

Completion of the multiplication process is determined by a counter in the control logic 30. Once multiplication has completed, the product is available in registers 40 and 50 with register 40 holding the 16 most significant bits of the product and register 50 holding the 16 least significant bits of the product.

Division

A first aspect of the applicant's invention simplifies the division procedure by always subtracting the divisor (adding its 2's complement) during each step of the division algorithm except the first step, wherein a dummy left shift is conducted, and last, wherein a right shift correction cycle is conducted. In contrast, both the restoring and standard nonrestoring methods of division add the divisor when both the carry-out bit of the adder and the shifted out bit of the shifter are both 0 and subtract the divisor when either the carry-out bit of the adder or the shifted out bit of the shifter is a 1 (for descriptions of the restoring and nonrestoring methods of division, see, e.g., Mano reference).

A second aspect allows both multiplication and division operations to share the same hardware configuration. By adding two additional steps to the division algorithm, an initial dummy left shift and a final right shift correction cycle, the shared hardware configuration can be optimized for fast multiplication and the necessity of adding an additional shifter to accommodate the two operations can be eliminated.

In a division operation, the first step in the applicant's division process is to make a dummy left shift. This can be done, for example, by loading a 32-bit dividend into the registers 40 and 50, subtracting a zero from the contents of the register 40 by an adder 70, passing a result generated by the adder 70 to the most significant 16 bits of the inputs to the shifter 90 (bits 16–31) through multiplexer 80, passing the contents of register 50 to the inputs of the least significant 16 bits of shifter 90 (bits 0–15), generating outputs from shifter 90 which include the inputs shifted one bit to the left with a 0 shifted into the LSB location, writing the most significant 16 bits of the outputs of shifter 90 into register 40, the least significant 16 bits of the outputs into register 50, and the shifted out bit 92 into flip-flop 35.

In subsequent cycles, the divisor is stored in register 60 and subtracted from the contents of register 40 through adder 70 (by adding its 2's complement). Within the control logic 30, a carry-out bit generated by the adder 70 is logically OR'ed with the contents of flip-flop 35. If the result is a 1, control signal 82 commands the multiplexer 80 to pass the sum generated by adder 70 to the most significant 16-bits of shifter 90, and the contents of register 50 are passed to the inputs of the least significant 16-bits of shifter 90. The outputs of the shifter 90 include the inputs shifted one bit to the left with the result from logically OR'ing the carry-out bit of adder 70 with the contents of flip-flop 35 shifted into its LSB location. The most significant 16 bits of the outputs are then written into register 40, the least most significant 16 bits of the outputs into register 50, the shifted out bit 92 into flip-flop 35, and the process repeated until division is completed.

If the logically OR'ed result is a 0, however, then the contents of register 40, instead of the sum generated by adder 70, are passed to the most significant 16-bits of the inputs to shifter 90 by multiplexer 80 and the contents of register 50 are passed to the least significant 16-bits of the inputs to shifter 90. The outputs of shifter 90 would then include these inputs shifted one bit to the left with the result from logically OR'ing the carry-out bit of adder 70 with the contents of flip-flop 35 shifted into its LSB location. The most significant 16 bits of the output are then written into register 40, the least significant 16 bits written into register 50, the shifted out bit 92 into flip-flop 35, and the process repeated until division is completed.

Completion of the division process is determined by a counter in control logic 30. Because the shifter 90 is located after the adder 70 and conducts an automatic left shift after the last subtraction operation, a final right shift correction cycle must be made. This can be accomplished, for example, by writing the final outputs of shifter 90 into registers 40 and 50, the shifted out bit 92 into flip-flop 35, then following the same procedure as the dummy left shift, except that this time it would be a dummy right shift with the contents of flip-flop 35 being shifted into the MSB location of the outputs of shifter 90. Following the correction cycle, the outputs of the most significant 16 bits of shifter 90 are written into register 40 and read out as the remainder, and the outputs of the least significant 16 bits of shifter 90 are written into register 50 and read out as the quotient.

Hybrid Adder Construction

Figure 2:
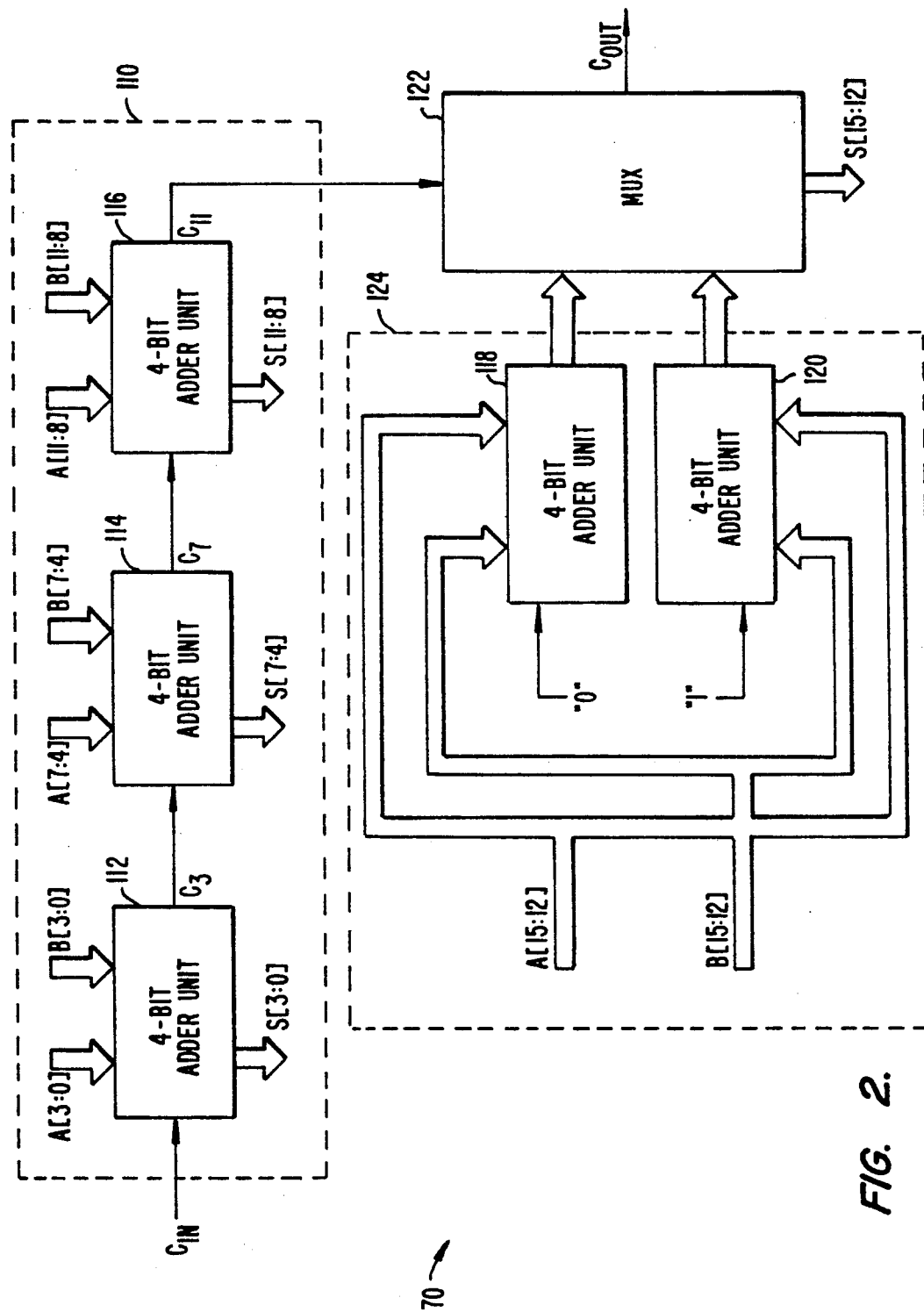
FIG. 2 is a block diagram of an adder circuit utilizing aspects of the present invention.

A third aspect of the applicant's invention is a hybrid carry-lookahead/carry-select adder construction. FIG. 2 illustrates an example of an adder utilizing this aspect of the applicant's invention. Although the figure depicts an unit which sums two 16 bit numbers, the same concepts and principles herein disclosed are equally applicable to other size adders.

The adder circuitry shown in FIG. 2 consists of two sections, a carry lookahead adder section 110 which sums the first 12 bits of two numbers, A and B (bits 0-11), and a carry select adder section 124 which sums the last 4 bits of the two numbers, A and B (bits 12-15). Since the carry lookahead adder section 110 and carry select adder section 124 run in parallel, the hybrid arrangement can calculate a sum faster than a conventional 2-level carry lookahead adder.

In the example, the carry lookahead adder section 110 includes three 4-bit adder units 112, 114 and 116 connected in series. The first adder unit 112 has as inputs a carry-in bit $C_{in}$ and the first four bits of the addends, A[3:0] and B[3:0], and has as outputs the first four bits of the sum, S[3:0], and a carry-out bit $C_3$. The second adder unit 114 has as inputs the carry-out bit $C_3$ of the previous adder unit 112 and the second four bits of the addends, A[7:4] and B[7:4], and has as outputs the second four bits of the sum, S[7:4], and a carry-out bit $C_7$. Finally, the third adder unit 116 has as inputs the carry-out bit $C_7$ of the previous adder unit 114 and the third four bits of the addends, A[11:8] and B[11:8], and has s outputs the third four bits of the sum, S[11:8], and a carry-out bit $C_{11}$.

In contrast to the conventional carry lookahead adder (CLA) which utilizes the following equations: (see, e.g., Hwang ref., eq. 3.19 to 3.22), $$G_i = A_i \cdot b_i \tag{1a}$$

$$P_i = A_i \oplus B_i \tag{1b}$$

$$S_i = P_i \oplus C_{i-1} \tag{1c}$$

$$C_i = G_i + P_i C_{i-1} \tag{1d}$$

Where:
$A_i$, $B_i$ are the ith bits of the addends, A, B;
$G_i$, $P_i$ are the corresponding ith carry generate and carry propagate auxiliary functions to $A_i$, $B_i$;
$S_i$, $C_i$ are the corresponding ith bits of the sum and carry to $A_i$, $B_i$; and
$\cdot, +, \oplus$ are AND, OR and EXCLUSIVE-OR LOGIC functions respectively;

the applicant's implementation utilizes the following equations:

$$G_i = A_i \cdot B_i \tag{2a}$$

$$P_i = A_i + B_i \tag{2b}$$

$$S_i = C_{i-1} \cdot P_i \cdot G_i + C_{i-1} \cdot P_i \cdot G_i + C_{i-1} \cdot G_i \tag{2c}$$

$$C_k = G_k + P_k \cdot C_{k-1} \tag{2d}$$

$$C_{n-1} = G_{n-1} + G_{n-2} P_{n-1} + \ldots + C_{-1} P_0 P_1 \ldots P_{n-1} \tag{2e}$$

where:
k = 0, 1, 2, 4, 5, 6, 8, 9, 10, 12, 13, 14, and
n = 4, 8, 12, 16 for a 16-bit CLA.

Figure 3A:
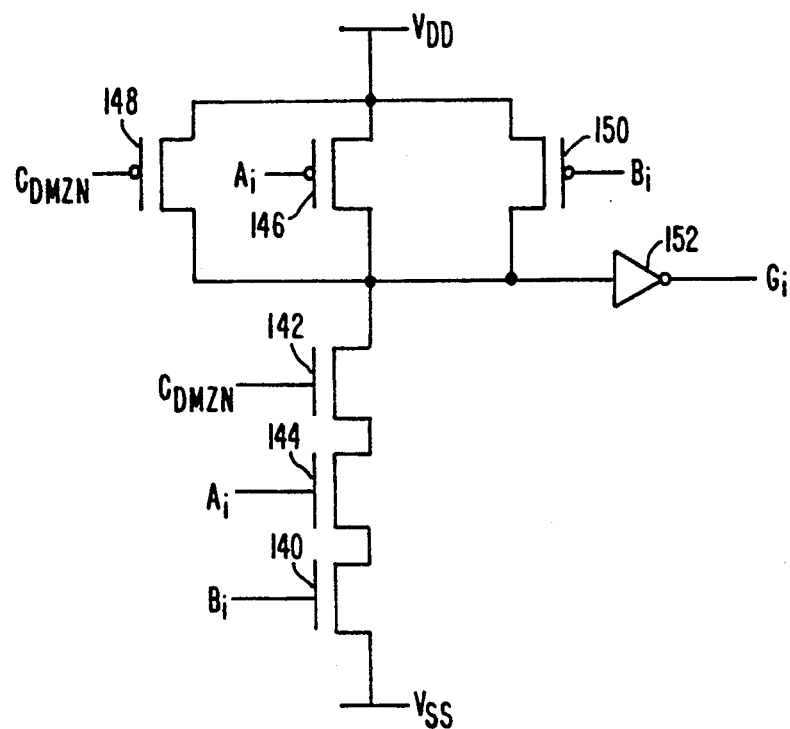
FIG. 3a is a circuit diagram of a carry generate unit utilized in the present invention.
Figure 3B:
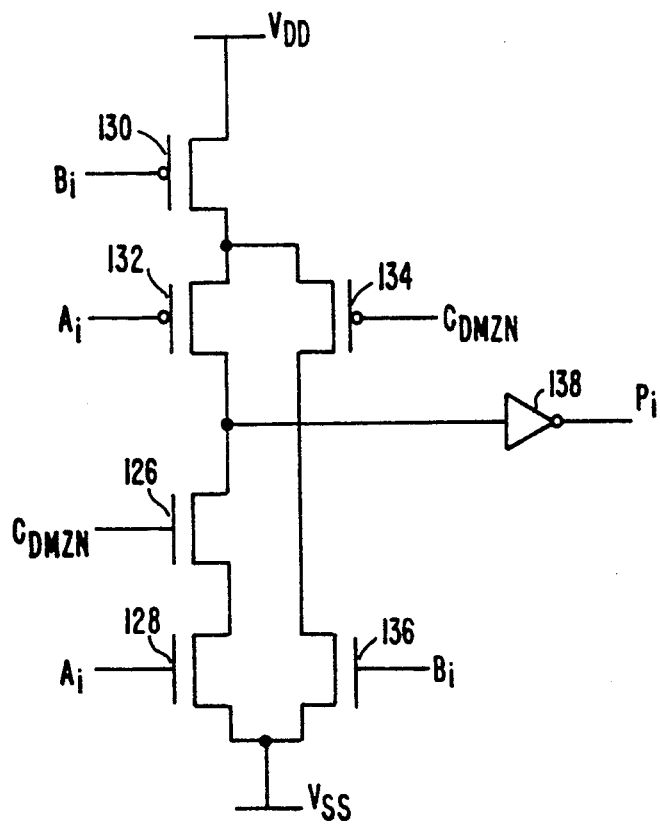
FIG. 3b is a circuit diagram of a carry propogate unit utilized in the present invention.

FIG. 3a and 3b illustrate conventional circuits which implement eqs. (2a) and (2b) for calculating the carry generate and propagate functions, $G_i$ and $P_i$, respectively. In both circuits, CDMZN is a control logic command whose purpose will be discussed below in another aspect of the applicant's invention.

Figure 4:
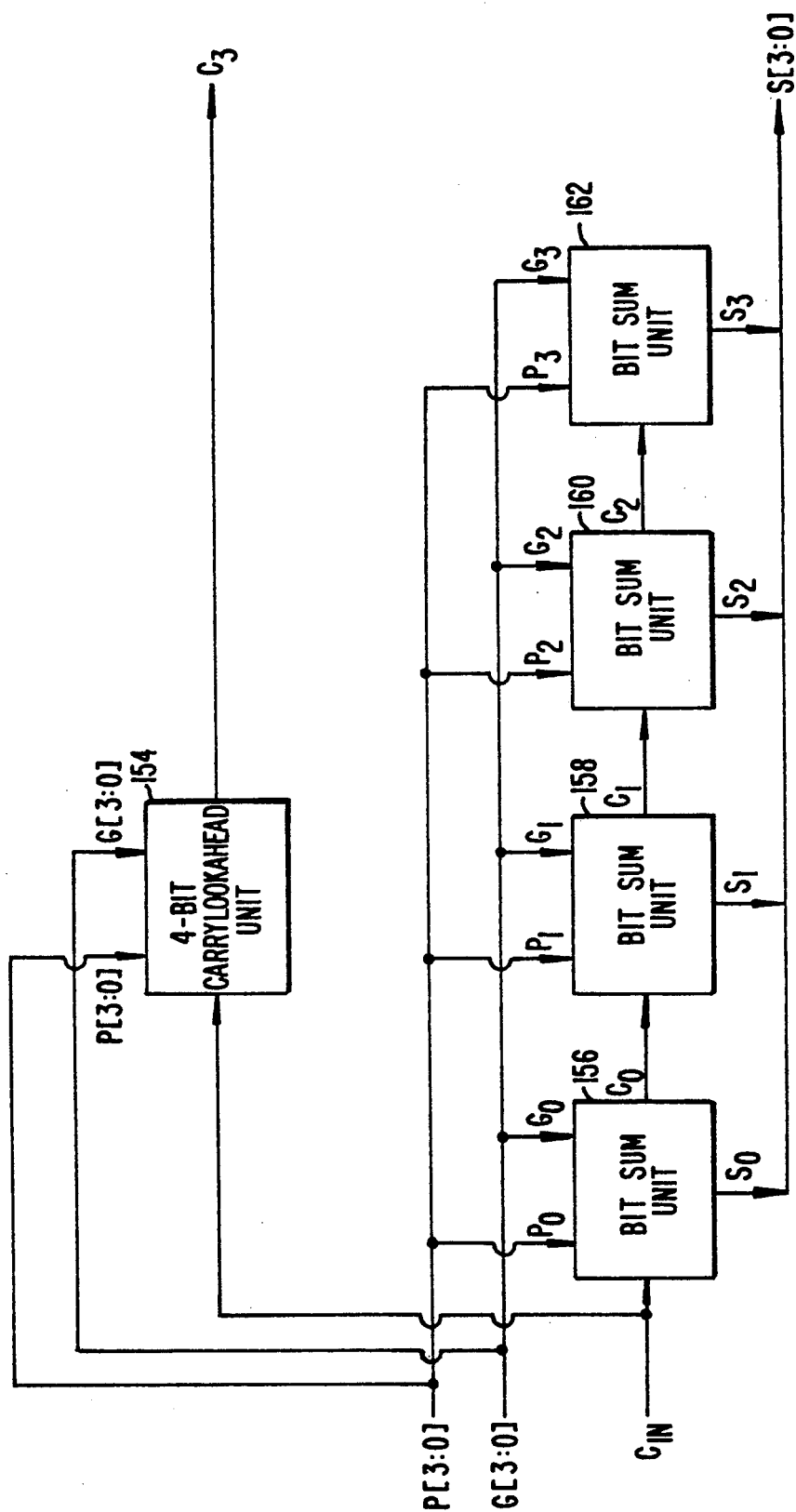
FIG. 4 is a block diagram of a 4-bit carry lookahead and summation unit utilized in the present invention.

FIG. 4 illustrates a block diagram of the carry lookahead and summation units which implement eqs. (2c), (2d) and (2e) for 4-bit adder unit 112. Only the final carry-out bit (of the 4-bit block), $C_3$, is calculated by the 4-bit carry lookahead unit 154, while the interim carry-out bits $C_0$, $C_1$ and $C_2$, as well as, sum bits $S_0$, $S_1$ and $S_2$, are calculated in bit sum units 156, 158 and 160 respectively. The final bit sum, $S_3$, is calculated in sum unit 162.

Figure 5:
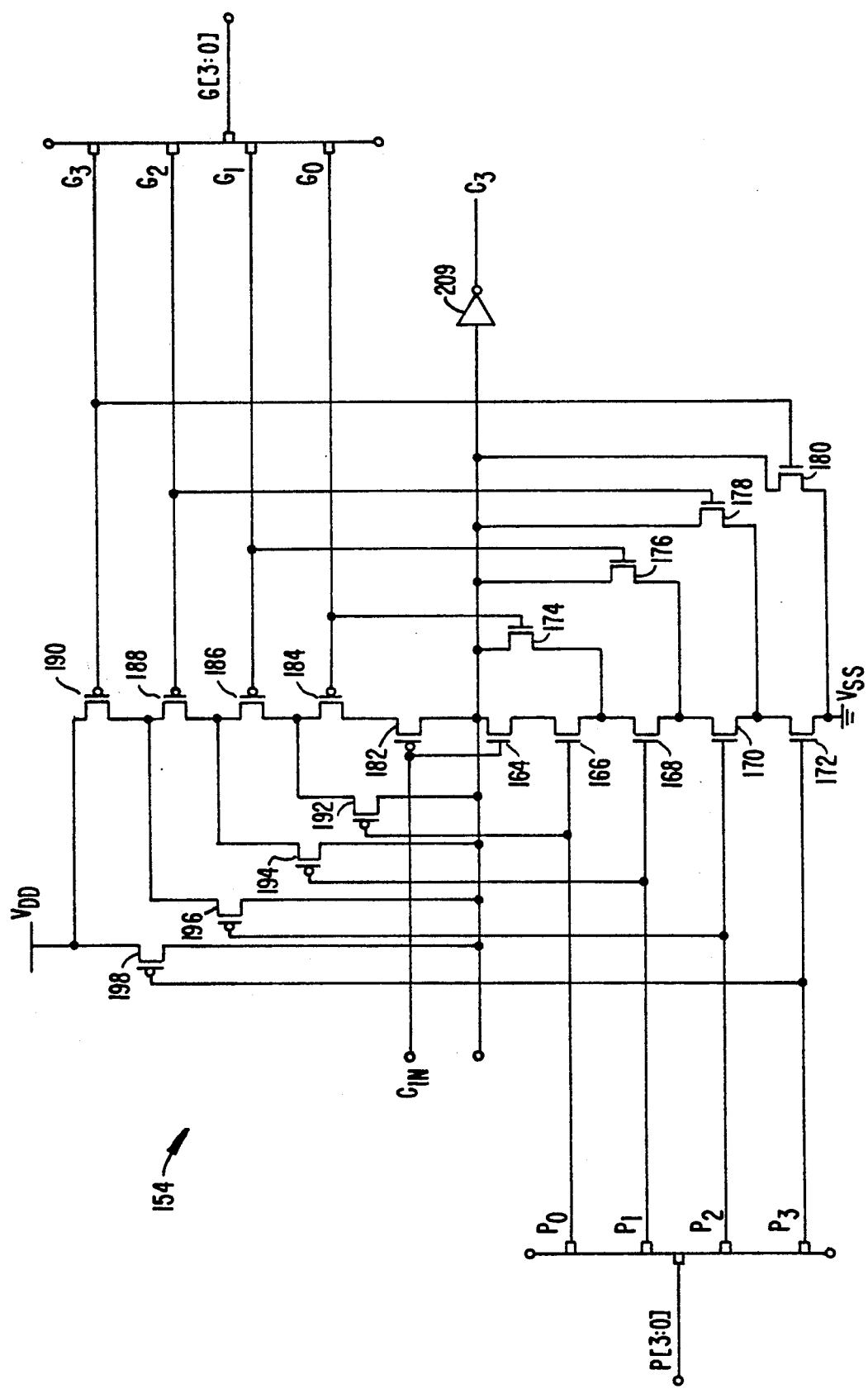
FIG. 5 is a diagram of a 4-bit carry lookahead circuit utilized in the present invention.

FIG. 5 illustrates the complex gate circuitry utilized in implementing the 4-bit carry lookahead unit 154. The unit receives four carry propagate bits, P[3:0], four carry generate bits, G[3:0], and a carry-in bit, $C_{in}$, and generates a carry-out bit, $C_3$, in response thereto.

Figure 6:
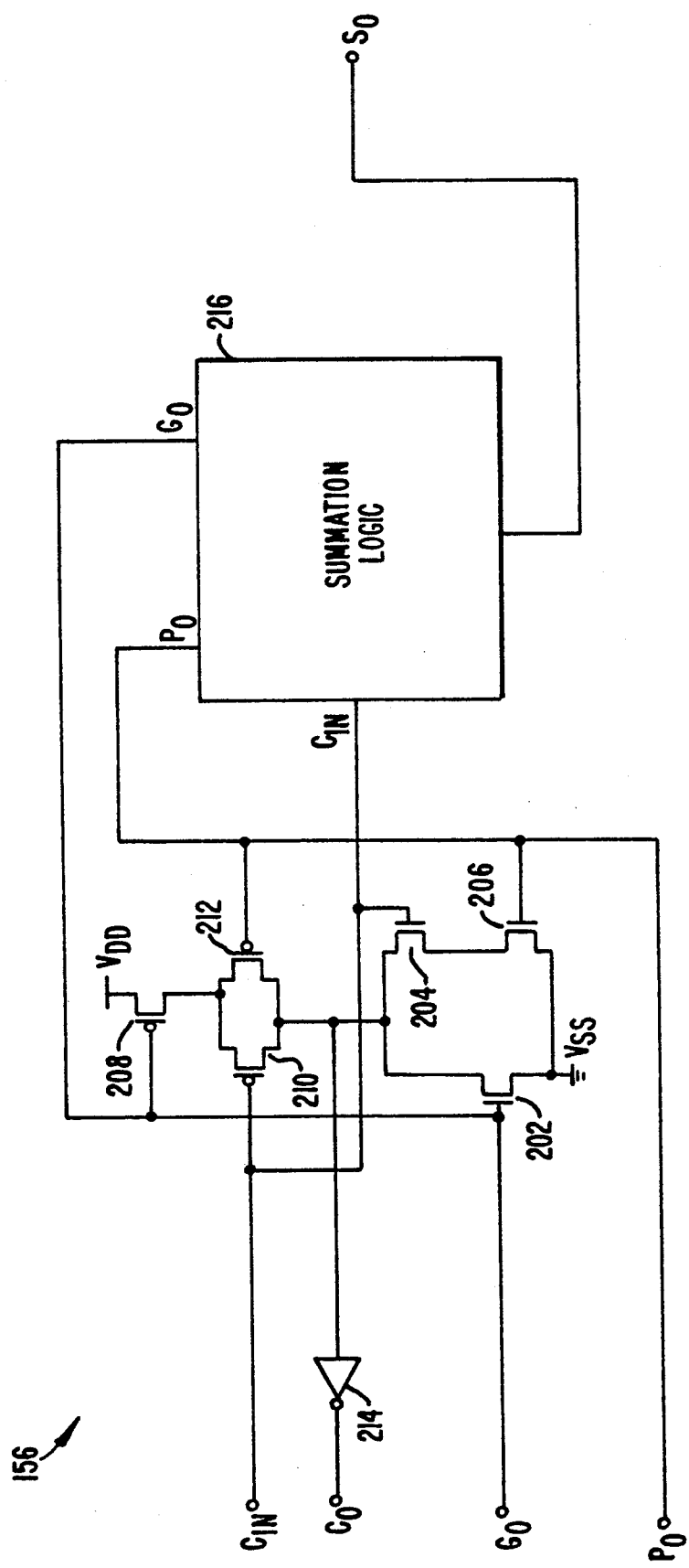
FIG. 6 is a diagram of a summation with carry-out circuit utilized in the present invention.

FIG. 6 illustrates, as an example, a conventional implementation of eq. (2d) for calculating the carry-out bit $C_0$ in bit sum unit 156. Identical circuits are also implemented in bit sum units 158 and 160 to calculate carry-out bits $C_1$ and $C_2$ respectively.

Figure 7:
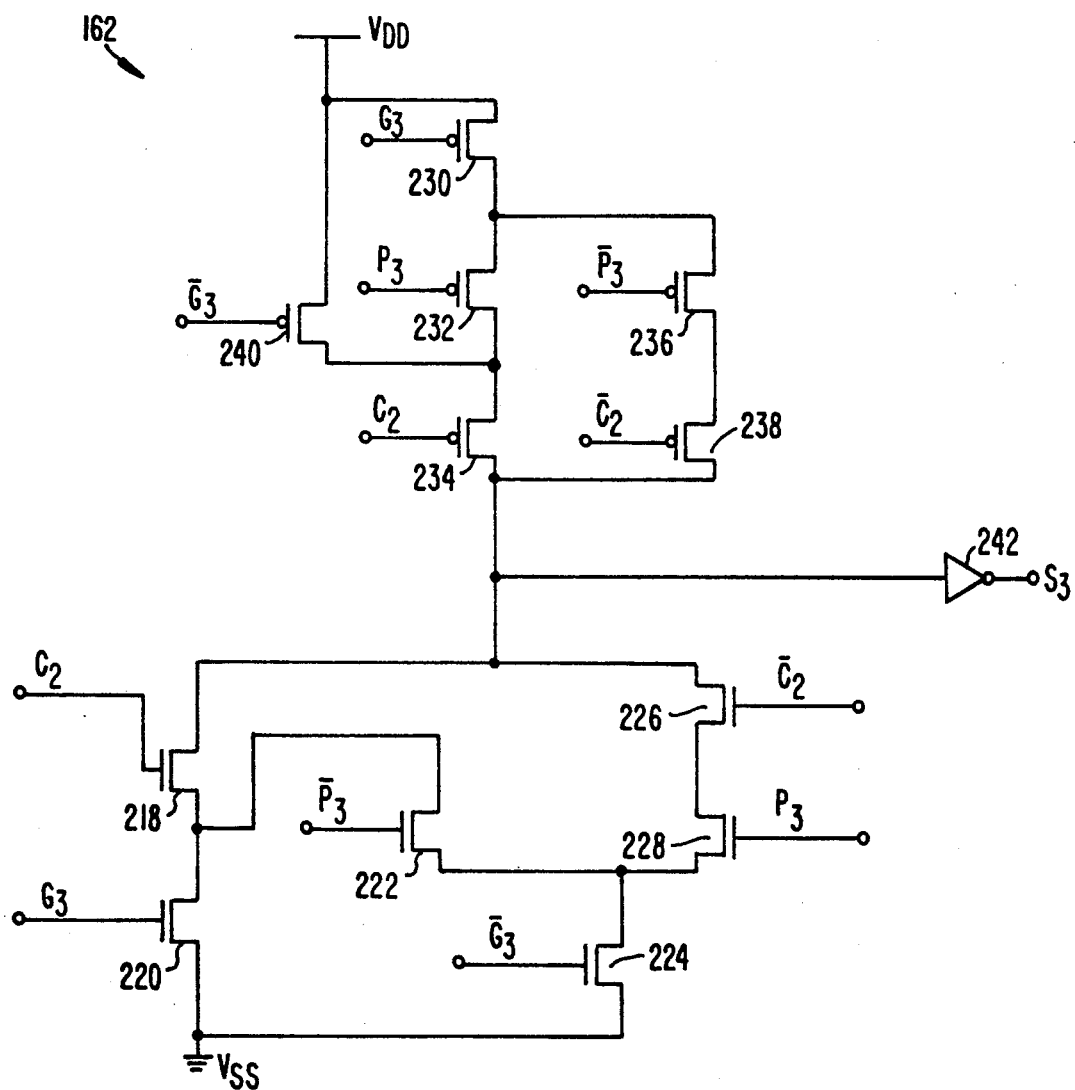
FIG. 7 is a diagram of a summation without carry-out circuit utilized in the present invention.

FIG. 7 illustrates the complex gate circuitry utilized in implementing bit sum unit 162. The same implementation is also used for the bit sum portions of bit sum units 156, 158 and 160, and is representatively depicted as unit 216 in FIG. 6.

While the carry lookahead adder section 110 is calculating the sum of the first 12-bits of A and B, S[11:0], and the carry-out bit $C_{11}$, the carry select adder section 124 is calculating two sets of values for the sum of the last 4-bits of A and B, S[15:12], and a final carry-out bit $C_{out}$. The first set is calculated by 4-bit adder 118 which calculates the sum of the last 4-bits of A and B, S[15:12], with an assumed value for $C_{11}$ of 0. The second set is calculated by 4-bit adder 120 which calculates the sum of the last 4-bits of A and B, S[15:12], with an assumed value for $C_{11}$ of 1. The actual value of $C_{11}$, as calculated by the carry lookahead section 110, is then used to select the appropriate outputs, either that of 4-bit adder 118 or 120, through multiplexer 122.

Control Lookahead Feature

A fourth aspect of the applicant's invention is a control lookahead feature. This feature pre-calculates a control signal so that it is immediately available when required, thus eliminating waiting caused by combinational logic gate delays. By eliminating such logic delays in each clock cycle, the requisite clock cycle can thus be shortened to increase operational speed. Although only the following control lookahead application is shown, the same concepts disclosed herein can be used in other similar situations.

When multiplying, the multiplication algorithm looks to the LSB of register 50 in each step to determine whether the contents of register 40 or a zero is to be added to the contents of register 60. If the LSB is a 1, the contents of register 40 are added to the contents of register 60; if the LSB is a 0, a zero is added to the contents of register 60.

In the applicant's invention, when a zero is to be added to the contents of register 40, it is accomplished through the CDMZN command in the carry generate and propagate circuits of FIGS. 3a and 3b. From the figures, the following equations are derived:

$$G_i = B_i A_i CDMZN \quad (3)$$

$$P_i = B_i + A_i CDMZN \quad (4)$$

When addition of a zero is required, the control signal CDMZN must be set to 0. When the contents of register 40 are to be added to register 60, CDMZN must be set to 1. Thus, CDMZN should be the same logic level as the LSB of register 50.

Figure 8:
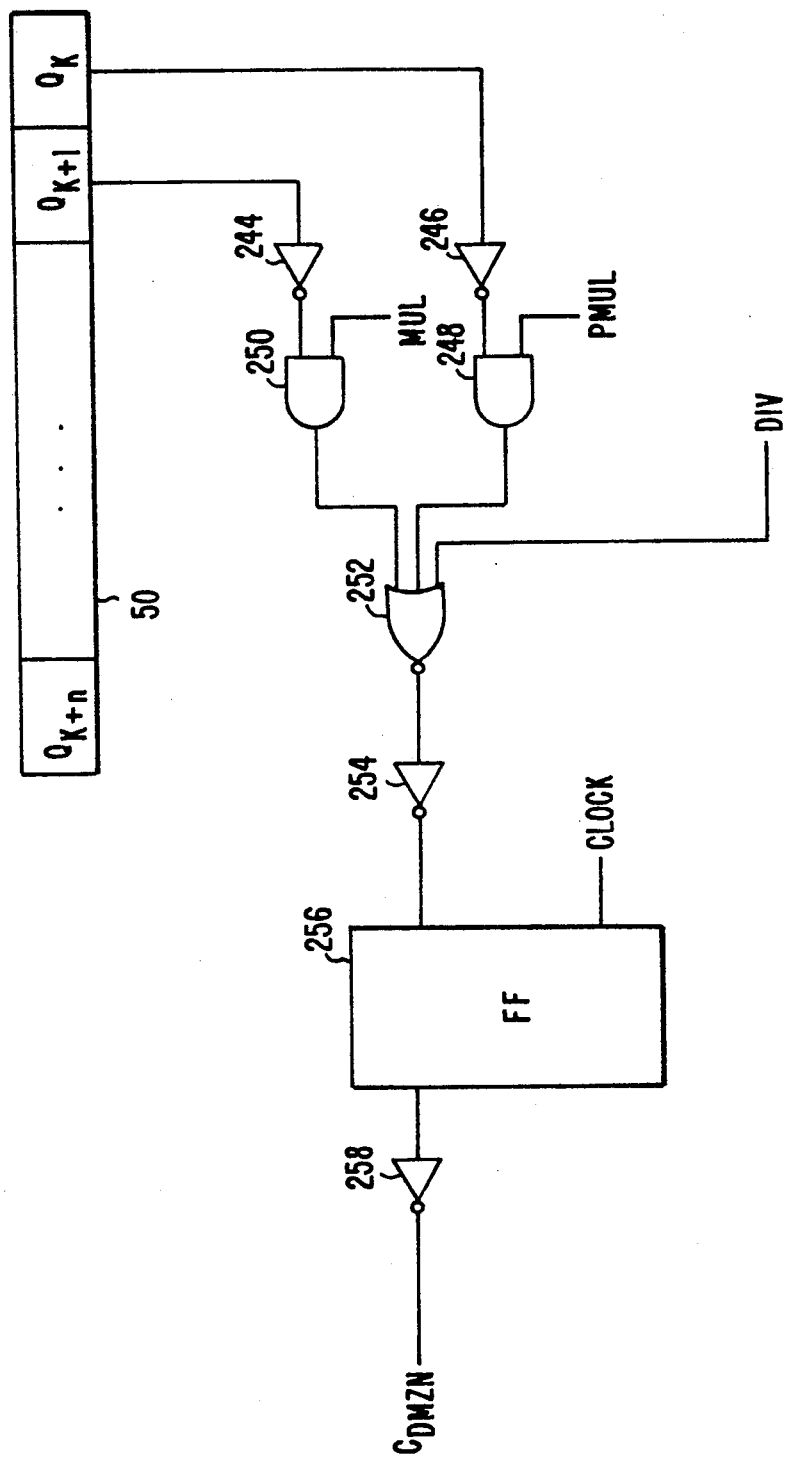
FIG. 8 is a logic diagram for determining a zero command signal to a carry lookahead adder's propagate and generate circuit utilizing aspects of the present invention.

FIG. 8 illustrates a circuit for deriving the control signal CDMZN. Mode selection between multiplication or division is accomplished through the inputs PMUL, MUL and DIV. When dividing, PMUL and MUL are set to 0 and DIV is set to 1. When multiplying, DIV is set to 0 and either PMUL or MUL, but not both, will be equal to a 1.

Before the multiplication process begins, the initial value of CDMZN is predetermined. First, PMUL is set to 1, MUL to 0 and DIV to 0. Second, by tracing the logic from the LSB of register 50, $Q_k$, and the bit immediately to the left of the LSB (which is the next LSB in the multiplication process), $Q_{k+1}$, it can be shown that the input to flip-flop 256 is the inverse of $Q_k$.

On the clock cycle initiating the multiplication process, the previously calculated input to flip-flop 256 is clocked out. CDMZN which is the output of inverter 258 can then be shown to be equal to $Q_k$. Simultaneously, the next value for CDMZN is being determined by setting PMUL to 0, MUL to 1 and keeping DIV to 0. With these settings, it can be shown that the new input to flip-flop 256, and the inverse of the next value for CDMZN, will be equal to the inverse of $Q_{k+1}$.

In succeeding clock cycles, the contents of register 50 will each time be shifted one to the right. In each clock cycle, CDMZN will then become the previous $Q_{k+1}$ (the new $Q_k$), and with PMUL, MUL and DIV remaining the same, the new input to flip-flop 256 will be set to the inverse of the next value of CDMZN (the new $Q_{k+1}$).

Thus, by using the fore described control lookahead circuit for calculating CDMZN, the system saves the delay period going through inverter 244, AND gate 250, NOR gate 252, and inverter 254 during each step in the multiplication cycle. Although one additional clock cycle is used in the multiplication process, the time savings from these circuit elements through sixteen cycles more than compensates for the additional clock cycle used.

Although the various aspects of the present invention have been described with respect to a preferred embodiment, it will be understood that the invention is entitled to full protection within the full scope of the appended claims.

What is claimed is:

1. A circuit for conducting integer division, comprising:

a first register having a plurality of bit locations including a first and second portion;

a second register having a plurality of bit locations equal in number to said first portion of said first register;

means for subtracting the contents of said second register from the contents of said first portion of said first register to generate a difference and a carry-out bit;

a flip-flop;

logical OR means connected to said subtracting means and said flip-flop, for logically ORing said carry-out bit and the contents of said flip-flop and generating a multiplexer selection signal in response thereof;

multiplexer means for receiving as inputs, the contents of said first portion of said first register, said difference from said subtracting means, and said multiplexer selection signal, and generating as outputs in response thereof, either the contents of said first portion of said first register or said difference from said subtracting means, the selection of which being determined by the logic level of said multiplexer selection signal;

a shifter having a first set of inputs for receiving said multiplexer outputs, a second set of inputs for receiving the contents of said second portion of said first register, and a carry-in input for receiving said multiplexer selection signal, and a set of outputs generated by shifting said first and second set of inputs each one bit location to the left with said carry-in input being shifted into a least significant bit location of said output and said most significant bit of said first set of inputs being a shifted out bit;

means for storing said outputs of said shifter into the contents of said first register and said shifted out bit into said flip-flop.

2. The circuit as recited in claim 1, said first portion of said first register and said second register both having n bit locations, wherein said subtracting means comprises:

a first means for adding the contents of the first k bits of said first portion of said first register to the 2's complement of the first k bits of said second register to generate the first k bits of said difference and a kth carry-out bit, where k is less than n;

a second means for adding the contents of the next n-k bits of said first portion of said first register, the 2's complement of the contents of the next n-k bits of said second register, and a "0" to generate a first partial sum and a first nth carry-out bit;

a third means for also adding the contents of the next n−k bits of said first portion of said first register, the 2's complement of the contents of the next n−k bits of said second register, and a "1" to generate a second partial sum and a second nth carry-out bit; and means for receiving said kth carry-out bit, said first and second partial sums, said first and second nth carry-out bits, and generating the remaining n−k bits of said difference and said carry-out bit.

3. A method of calculating a quotient and a remainder from a divisor and a dividend, comprising the steps of:

(a) initializing a counter to a number equal to the number of bits in said divisor, and storing said dividend in a first register having a plurality of bit locations, said plurality of bit locations having a first and second portion of bit locations, said first portion having a most significant bit location for initially storing a most significant bit of said dividend, said second portion having a least significant bit location for initially storing a least significant bit of said dividend, said most significant bit location being positioned to the left of said least significant bit location;

(b) shifting each of the contents of said first register one bit location to the left with a "0" being shifted into said least significant bit location and the contents of said most significant bit location being shifted into a flip-flop;

(c) storing said divisor in a second register having a plurality of bit locations equal in number to said first portion of said first register;

(d) subtracting the contents of said second register from the contents of said first portion of said first register to generate a difference and a carry-out bit;

(e) logically ORing said carry-out bit with the contents of said flip-flop to generate a multiplexer select signal;

(f) if said multiplexer select signal is a logical "1", then providing said difference to a first set of inputs to a shifter and the contents of said second portion of said first register to a second set of inputs to said shifter, but if said multiplexer select signal is a logical "0", then providing the contents of said first portion of said first register to said first set of inputs to said shifter and the contents of said second portion of said first register to said second set of inputs to said shifter, said first set of inputs being positioned to the left of said second set of inputs;

(g) generating a shifted out bit and a first and second set of shifter outputs by shifting each of the inputs of said shifter one bit location to the left with said multiplexer select signal being shifted into a least significant bit of said second set of outputs, a most significant bit of said second set of inputs being shifted into a least significant bit of said first set of outputs, and a most significant bit of said first set of inputs being said shifted out bit;

(h) storing said shifted out bit of said shifter into said flip flop, storing said first set of outputs of said shifter into said first portion of said first register, storing said second set of outputs of said shifter into said second portion of said first register, and decrementing said counter;

(i) repeating steps (d) through (h) until said counter has been decremented down to zero; and (j) after said counter has been decremented down to zero, shifting each of the contents of said first register one bit location to the right with the contents of said flip flop being shifted into the most significant bit location of said first register.

* * * * *